United States Patent [19]
Hayashi

[11] Patent Number: 6,099,129
[45] Date of Patent: Aug. 8, 2000

[54] ESTABLISHMENT FOR VIEWING IMAGE

[76] Inventor: Masahiko Hayashi, 12-22, Tsurumaki, 3-chome, Setagaya-ku, Tokyo, Japan

[21] Appl. No.: 09/191,678

[22] Filed: Nov. 13, 1998

[51] Int. Cl.[7] .................................................. G03B 21/14
[52] U.S. Cl. ................................ 353/79; 353/122; 353/28
[58] Field of Search .................... 353/10, 28, 30, 353/94, 122, 74, 79, 75, 77

[56] References Cited

U.S. PATENT DOCUMENTS

| | | | |
|---|---|---|---|
| 4,605,294 | 8/1986 | Bourdier et al. | 353/28 |
| 4,738,522 | 4/1988 | Lunde et al. | 353/28 |
| 5,291,297 | 3/1994 | Steinmeyer | 353/28 |
| 5,457,508 | 10/1995 | Ichihara et al. | 353/30 |
| 5,573,325 | 11/1996 | Lekowski | 353/28 |
| 5,669,685 | 9/1997 | Kotani et al. | 353/28 |
| 5,685,625 | 11/1997 | Beaver | 353/28 |
| 5,865,519 | 2/1999 | Maass | 353/28 |
| 5,890,787 | 4/1999 | McNelley et al. | 353/28 |
| 5,902,030 | 5/1999 | Blanchard | 353/30 |

*Primary Examiner*—William C. Dowling
*Attorney, Agent, or Firm*—Jordon and Hamburg LLP

[57] ABSTRACT

An establishment for viewing an image can display an image which is projected on the image display device located outside the opening of the compartment of the establishment by the image producing device. The close scenery component is disposed between the compartment and the image display device such that the scenery component hides the edge of the image which is displayed on the image display device so as to allow parallax or perspective parallax to be produced between the image and the close scenery component. Hence, the image is given depth, high reality, and a sense of perspective, and the spectators have illusion as if they are seeing the real scenery from the opening.

44 Claims, 15 Drawing Sheets

6,099,129

ESTABLISHMENT FOR VIEWING IMAGE

BACKGROUND OF THE INVENTION

The present invention is related to an establishment for viewing an image where spectators can see an image having a deep and high realistic scenery and the like from a compartment which is provided therein or is provided upon a movable object.

A conventional image viewing establishment such as a theater, a planetarium, an institution for having an exhibition, or the like, projects or exhibits an image at its maximum. Also, in order to produce parallax, the establishment cannot hide an edge of the image and its circumference intentionally. In a movie theater and so on, though the image is partitioned by a black curtain, it is clear that the curtain is a circumference of the image only and is not the benefit which produces parallax. That is, since a close scenery component which produces natural parallax had been eliminated intentionally between a circumference of the image and the image, even though it may be a large image, the image projecting establishment could not give a highly realistic feeling and vividness to the image.

Moreover, when the spectators see the usual scenery from a window, the scope of the scenery that can be seen differs greatly by a distance from a window and their actual position. It is a big factor that this parallax makes a scenery of a window point of view relate to an actual object. But, in a conventional image display establishment, even though a point of view was moved therein, the scope of the image that can be seen did not change at all and did not give depth to the image at all.

SUMMARY OF THE INVENTION

In view of the foregoing, it is an object of the present invention to provide an establishment for viewing an image that people can view a deep image and images with a highly realistic effect and presence and with a panoramic effect from an established viewing room, a movable viewing room of an amusement establishment, a hotel, a place for holding orchestras, a restaurant, or the like.

The above and further objects and novel features of the invention will more fully appear from the following detailed description when the same is read in connection with the accompanying drawings. It is to be expressly understood, however, that the drawing is for the purpose of illustration only and is not intended as a definition of the limits of the invention.

BRIEF DESCRIPTION OF THE INVENTION

DETAILED DESCRIPTION OF THE INVENTION

Preferred embodiments of the present invention are described in more detail below referring to the accompanying drawings.

Figure 1:
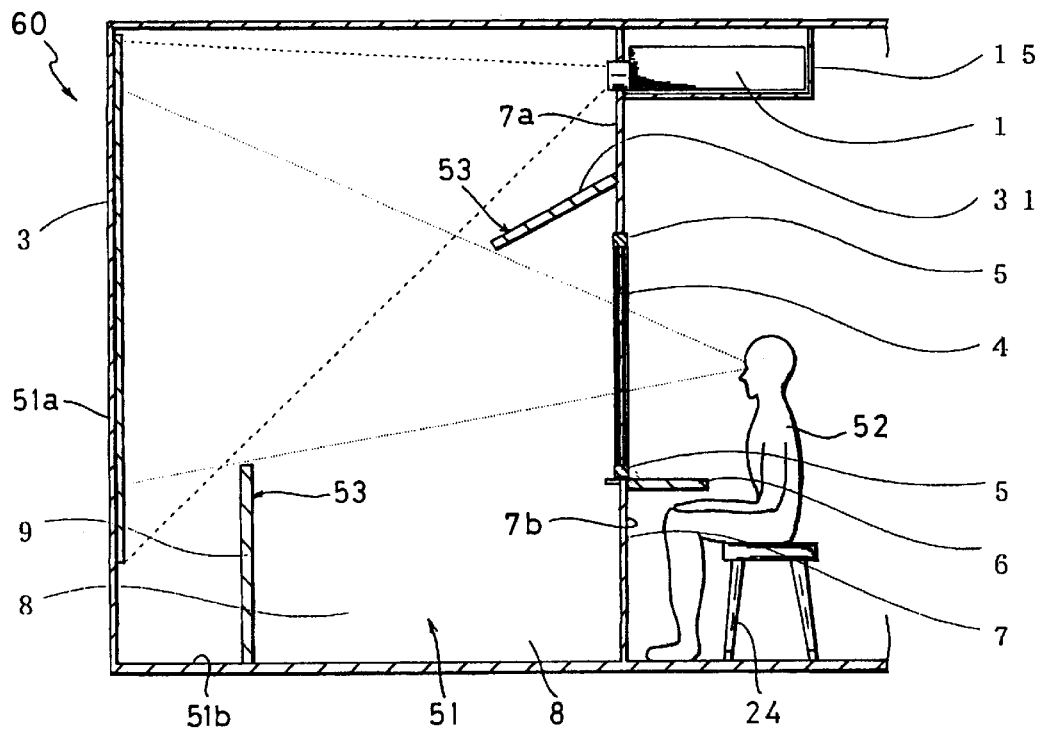
FIG. 1 is a cross-sectional view showing a first embodiment of an establishment for viewing an image of the present invention.
Figure 2:
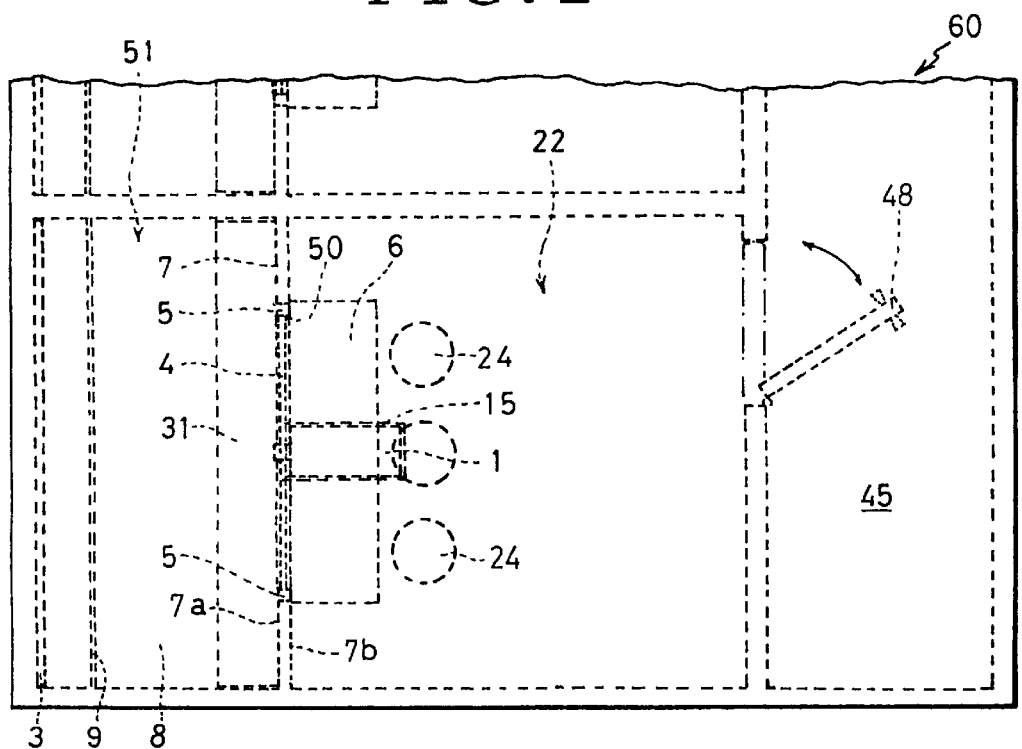
FIG. 2 is a plan view showing a first embodiment of the present invention.

An understanding of the present invention may be best gained by reference to FIGS. 1 and 2. FIGS. 1 and 2 illustrate an establishment for viewing an image of the first embodiment of the present invention. Numeral 60 is the establishment for viewing an image of the present invention. The establishment for viewing an image 60 comprises an image viewing room 22, which may be a part of a restaurant, a window frame 5, an image display room 51, a screen 3, a forward projecting type projector 1, a close scenery component 53, and a table 6. The image viewing room 22 is formed such that spectators can come in and out of the room 22 from a passage 45 through a door 48. The window frame 5 is fixed at an opening 50 provided at an outside wall surface 7 that is opposite from the passage 45 of the image viewing room 22. The window frame 5 supports a clear window 4. The image display room 51 covers a space, which can be used as a veranda 8 outside of the window frame 5. The screen 3, as an image display device, is provided at an inner portion of a wall surface 51a of the image display room 51. The forward projecting type projector 1, as an image display device, projects the image such that it is projected upon the screen 3 from a projector box 15 located at the upper portion adjacent the central portion of the outer wall surface 7 of the image viewing room 22.

The close scenery component 53 further comprises eaves 31 and a wall 9. The close scenery component 53 allows the parallax or far-and-near parallax to be produced between the spectators 52, who are viewing the image from inside the image viewing room 22, and the image. The eaves 31 is attached, at the upper portion of the window 4, to an outer wall surface 7a of the outside wall surface 7 of the image viewing room 22 such that the eaves 31 covers an upper portion of the image projected upon the screen 3. In addition, the wall 9 is attached to a floor surface 51b adjacent the screen 3 of the image display room 51 such that the wall 9 covers a lower portion of the image projected upon the screen 3.

The table 6 is attached to the inner wall surface 7b of the lower portion of the window 4 in the outside wall surface 7 of the image viewing room 22.

In the establishment for viewing an image 60 of the above-mentioned structure, a spectator 52 sits in a chair 24 disposed around the table 6 inside the image viewing room 22, which may be a part of a restaurant and view the image that is projected upon the screen 3 while the spectator 52 is having a meal so that a far-and-near parallax is produced between the spectator 52 and the image such that the spectator can view a deep image and feel the highly realistic effect.

Referring to FIGS. 3 to 39, other embodiments of the present invention will now be described. In the drawings of the embodiments, like components are denoted by like numerals as of the first embodiment and will be explained in no more details.

Figure 3:
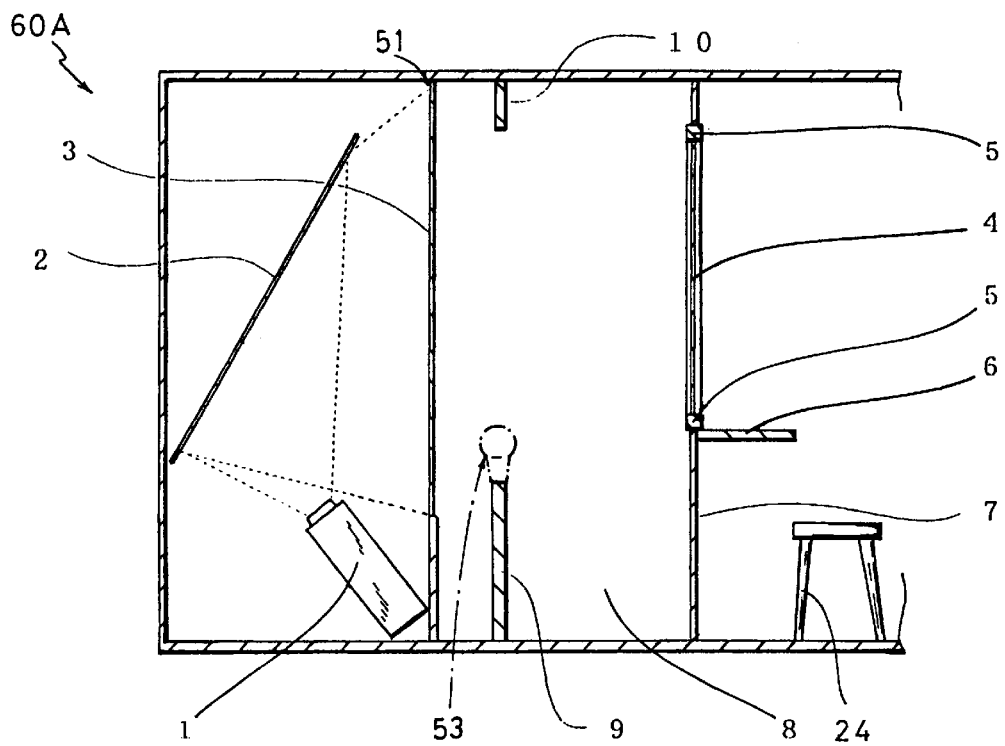
FIG. 3 is a cross-sectional view showing a second embodiment of the present invention.

A second embodiment of the present invention is shown in FIG. 3. It is distinguished from the first embodiment by the fact that a reflecting mirror 2 and a projecting type projector 1, which projects the image upon the reflecting mirror 2. The reflecting mirror 2 can project the image upon the back screen 3 from the rear of the screen 3. Then, the structure produces a back-face-projecting type image that can be projected upon the screen 3. Accordingly, an establishment for viewing an image 60A of the second embodiment will provide the effects equal to those of the first embodiment. Furthermore, even if the close scenery component 53, such as a flowerpot, is positioned on the central portion of the wall 9 located at a borderline of the image on the screen 3, the close scenery component 53 is not an obstacle in forming a shadow for the image and a parallax is emphasized even more.

Figure 4:
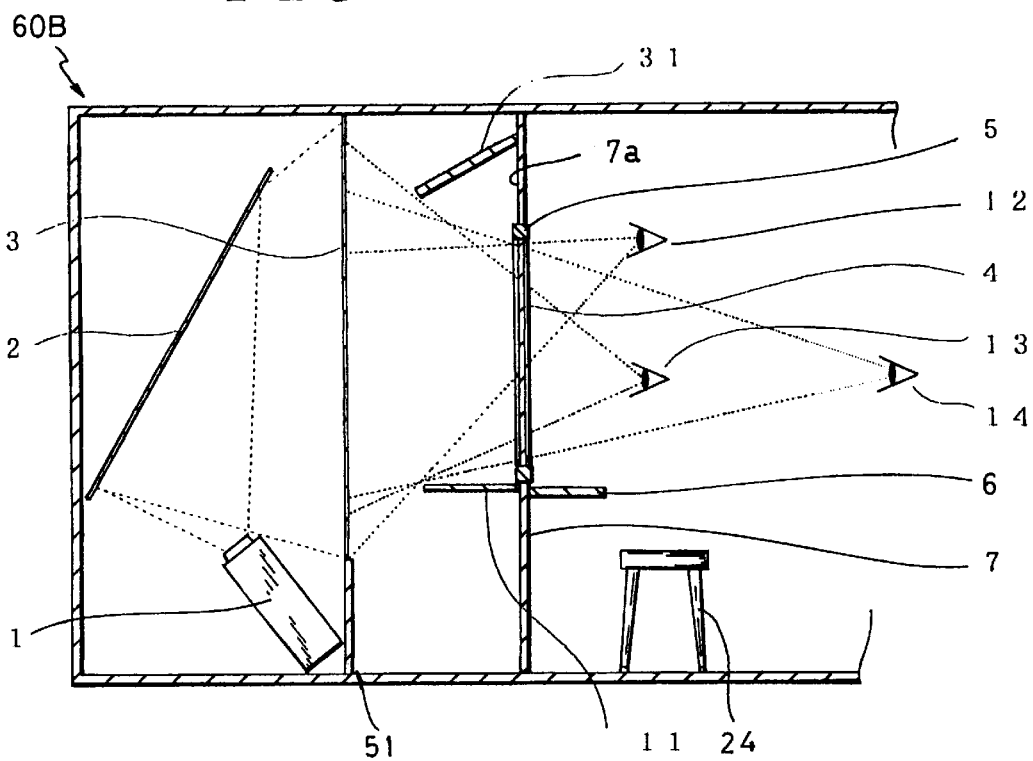
FIG. 4 is a cross-sectional view showing a third embodiment of the present invention.

A third embodiment of the present invention is shown in FIG. 4. It is distinguished from the second embodiment by the fact that the upper and lower end portions of the image on the screen 3 are hidden by the eaves 31 and by a blindfold board 11 as a close scenery component, which is provided near the window frame 5. In this case, at the view point 12, a spectator can view the image that is projected upon the screen, which is cut off at its upper and lower portions by the window frame 5 above the window 4 and by the blindfold board 11 under the window 4. At view point 13 relative to view point 12, the range of the viewable image is increased more upwardly and decreased more downwardly, and the upper end of the image is cut off by the eaves 31 of the window 4. On the other hand, at view point 14 at the interior of the room relative to view point 13, the range of the viewable image becomes smaller, and upper and lower end portions of the image are cut off by the window frame 5. In this way, the range of viewable image changes (perspective parallax) due to change in the view points and due to the establishment for viewing an image 60B with the depth and a highly realistic effect because the establishment 60B produces a parallax between the image and the close scenery component, such as the window frame, the blindfold, the eaves, or the like.

Figure 5:
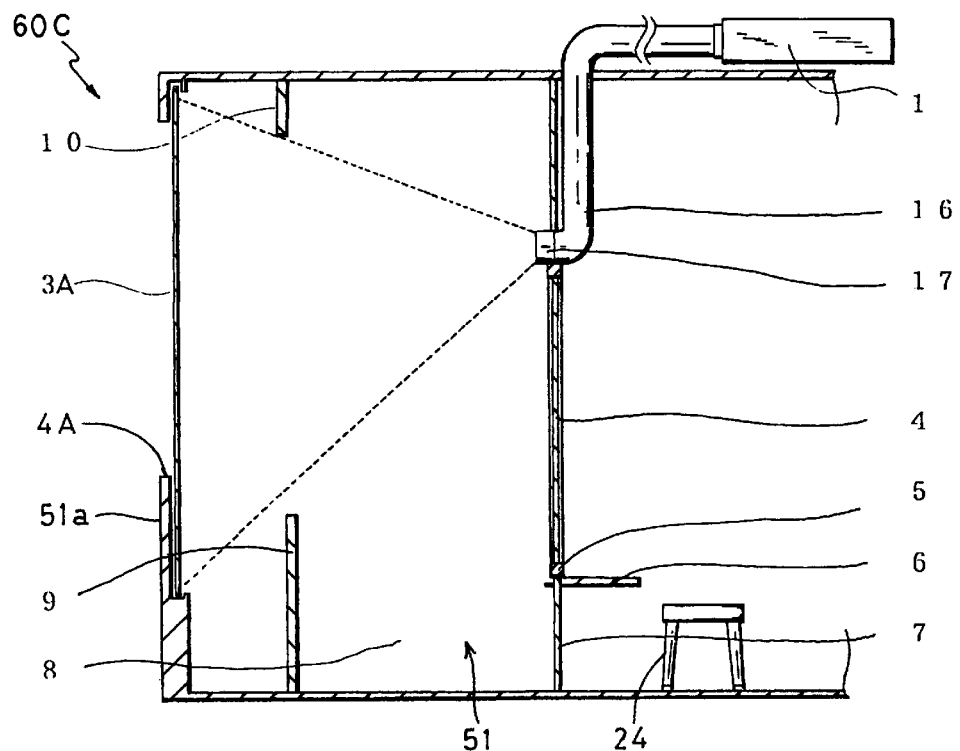
FIG. 5 is a cross-sectional view showing a fourth embodiment of the present invention.

A fourth embodiment of the present invention is shown in FIG. 5. It is distinguished from the first embodiment by the fact that a window 4A is formed on the wall surface 51a of the image display room 51, and a closure screen 3A is provided operably at the window 4A. Accordingly, an establishment for viewing image 60C of the fourth embodiment can be opened by way of the screen 3A. On a clear day where the wind can enter the establishment 60C, the spectators can see an outside scenery from the window 4. Of course, if the screen 3A is closed to the outside environment, they can view the image that is projected upon the screen 3A. Also, in this embodiment, the projector 1 itself is positioned apart from the projecting lens above the window 4 such that the projector 1 connects with the projecting lens by a light guide. Then, the light guide is not provided without the limits as an establishing place such that a space inside the room is used effectively. Furthermore, the opening and closing of the screen 3A to the outside environment may be accomplished by a screen of the rotation type, a leaping type, or the like, besides the sliding type. Also, a roller type may be used if a flexible material is used.

Figure 6:
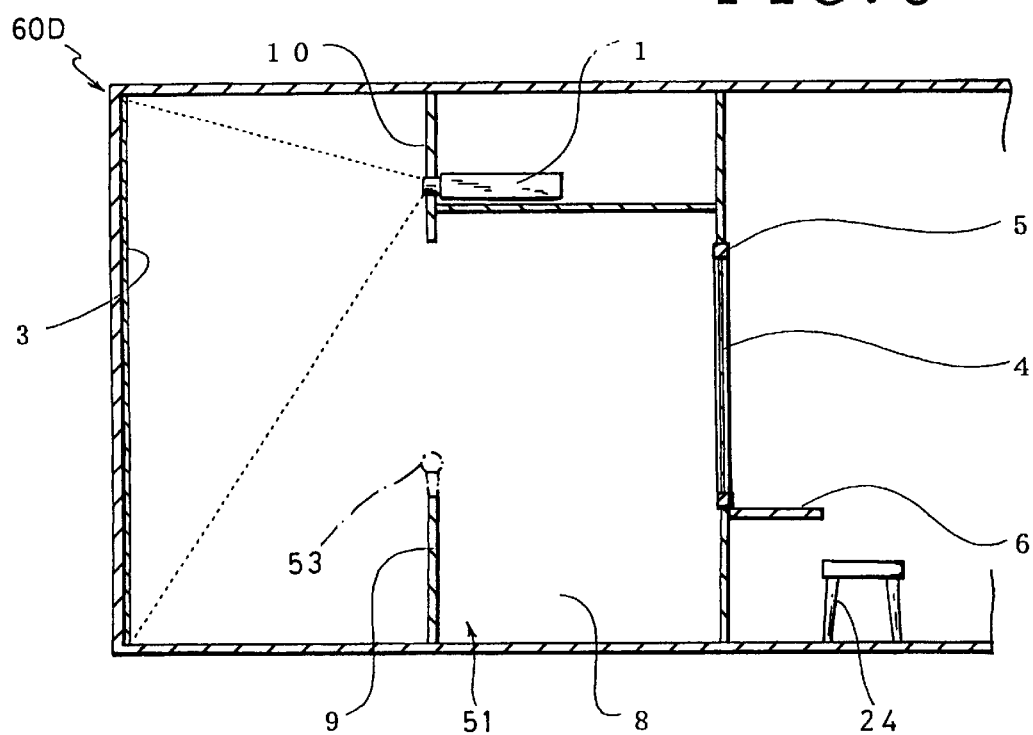
FIG. 6 is a cross-sectional view showing a fifth embodiment of the present invention.

A fifth embodiment of the present invention is shown in FIG. 6. It is distinguished from the first embodiment by the fact that the projector 1 is provided at an upper portion of the veranda 8. Accordingly, an establishment for viewing an image 60D of the fifth embodiment produces a highly realistic effect since the close scenery component 53 is not an obstacle to the screen 3 even if the close scenery component 53, such as a flowerpot, is positioned on the central portion on the wall 9 located at a borderline of the image on the screen 3 as the second embodiment.

Figure 7:
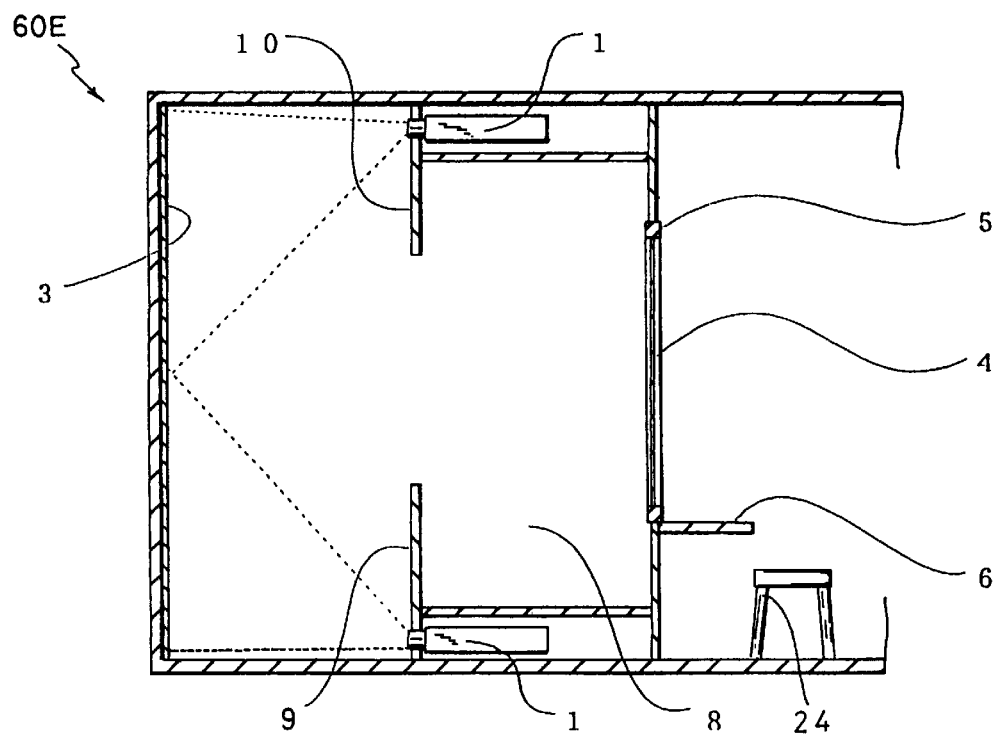
FIG. 7 is a cross-sectional view showing a sixth embodiment of the present invention.

A sixth embodiment of the present invention is shown in FIG. 7. It is distinguished from the fifth embodiment by the fact that the projectors 1, 1 are provided at upper and lower portions of the veranda 8. Accordingly, an establishment for viewing an image 60E of the sixth embodiment will provide the effects equal to those of the fifth embodiment even if the space between the screen 3 and the window 4 becomes narrower.

Figure 8:
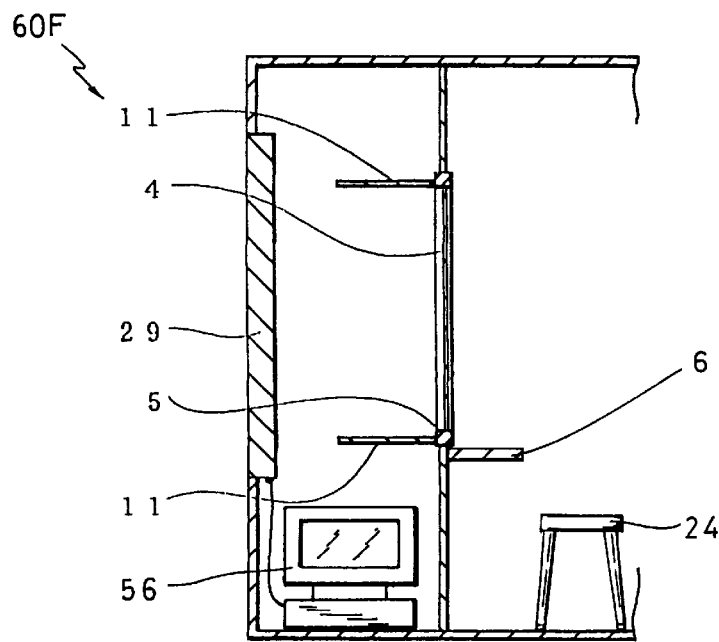
FIG. 8 is a cross-sectional view showing a seventh embodiment of the present invention.

A seventh embodiment of the present invention is shown in FIG. 8. It is distinguished from the first embodiment by the fact that a thin-type image device 29 used in a display, such as a liquid crystal display, a plasma display, or the like, is used as an image display device. The thin-type image device 29 is connected to the image supplying device 56 using an image producing device, such as a personal computer, a video tape recorder, or the like. Accordingly, an establishment for viewing an image 60F of the seventh embodiment has the thin-type image device 29 formed in the shape of a plane board. The blindfold board 11, which covers the window 4 and the ends of the image, is attached to all of the sides around the window 4 such that the blindfold board 11 is located forward of the image on the screen 3. The blindfold board 11, as a close scenery component, allows parallax to be produced so that the thin-type image device 29 needs a distance between the image of the screen 3 and the device 29. Moreover, if the thin-type image device 29 can be changed freely as a transparency of the screen, the spectator can enjoy viewing an outside scenery through the device 29 as a window when it is a clear day. Furthermore, the image supplying device 56, such as a personal computer or a video tape recorder, is used so that the image can be changed to a scenery, a motion picture, a still picture such as an advertisement, or the like so that the spectators can readily enjoy the image.

Figure 9:
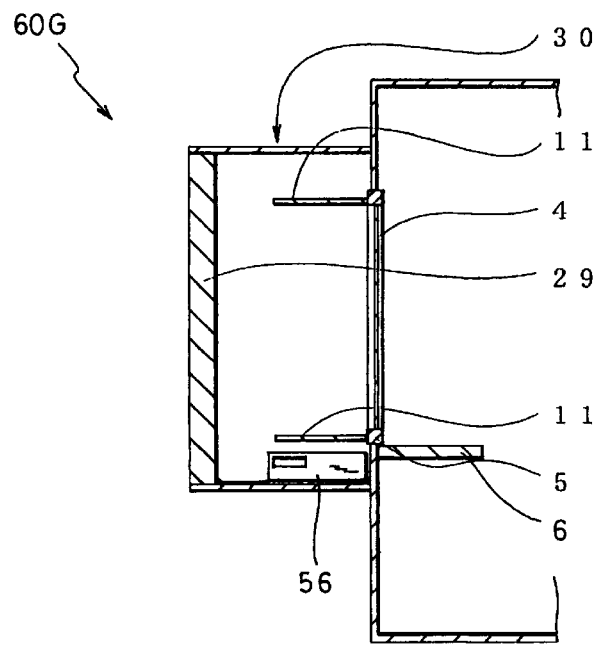
FIG. 9 is a cross-sectional view showing a eighth embodiment of the present invention.

An eighth embodiment of the present invention is shown in FIG. 9. It is distinguished from the seventh embodiment by the fact that the thin-type image device 29 and the close scenery components 11, 11 are formed in a bow window 30. Accordingly, an establishment for viewing an image 60G of the eighth embodiment is established easily because the bow window 30 can be attached to or be a part of a conventional window 4.

Figure 10:
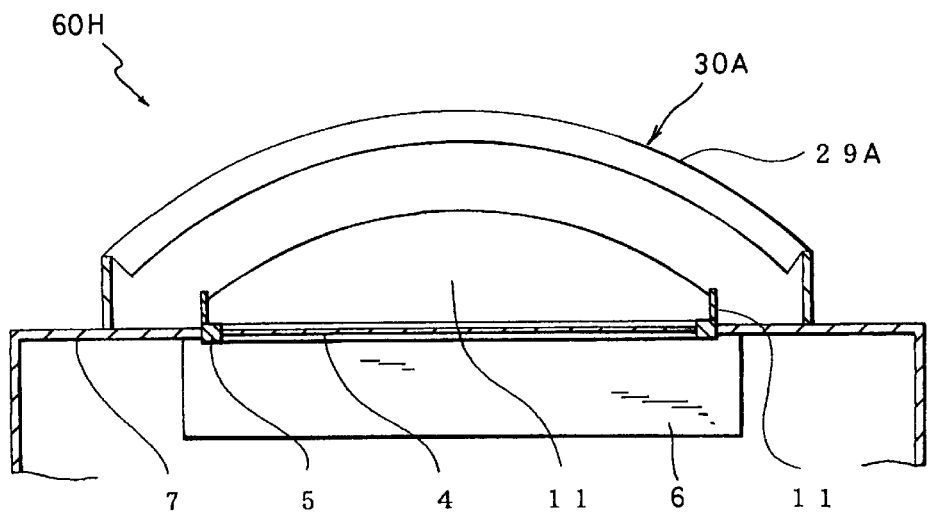
FIG. 10 is a cross-sectional view showing a ninth embodiment of the present invention.

A ninth embodiment of the present invention is shown in FIG. 10. It is distinguished from the eighth embodiment by the fact that a concaved thin-type image device 29A formed in the shape of a plane board is used. Accordingly, an establishment for viewing an image 60H produces a wide-angle vision range of the image from the window 4.

Figure 11:
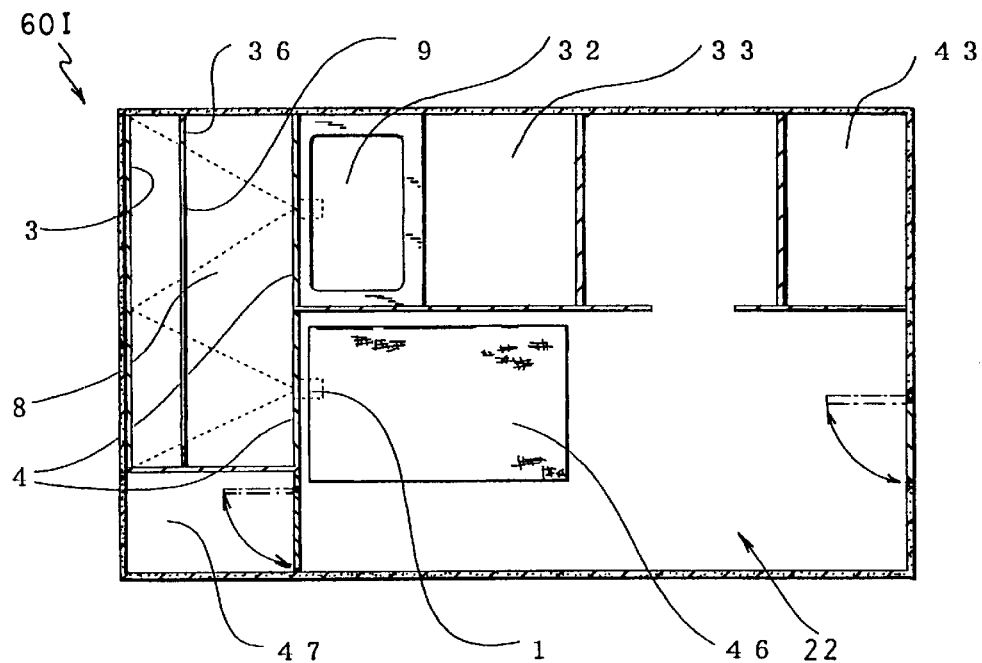
FIG. 11 is a cross-sectional view showing a tenth embodiment of the present invention.

A tenth embodiment of the present invention is shown in FIG. 11. It is distinguished from the first embodiment by the fact that the screen 3 is mounted to the veranda 8 such that a guest room 32 plays a part in the image viewing room 22. Accordingly, in an establishment for viewing an image 60I, the end of the image is covered by the wall 9 for a blindfold of the veranda 8 or by the other wall 36 for a blindfold as a close scenery component. The guests in the hotel can enjoy the image on the screen as if the image is real scenery without having anxiety that the guests are being observed through or are peeping through the window.

Figure 12:
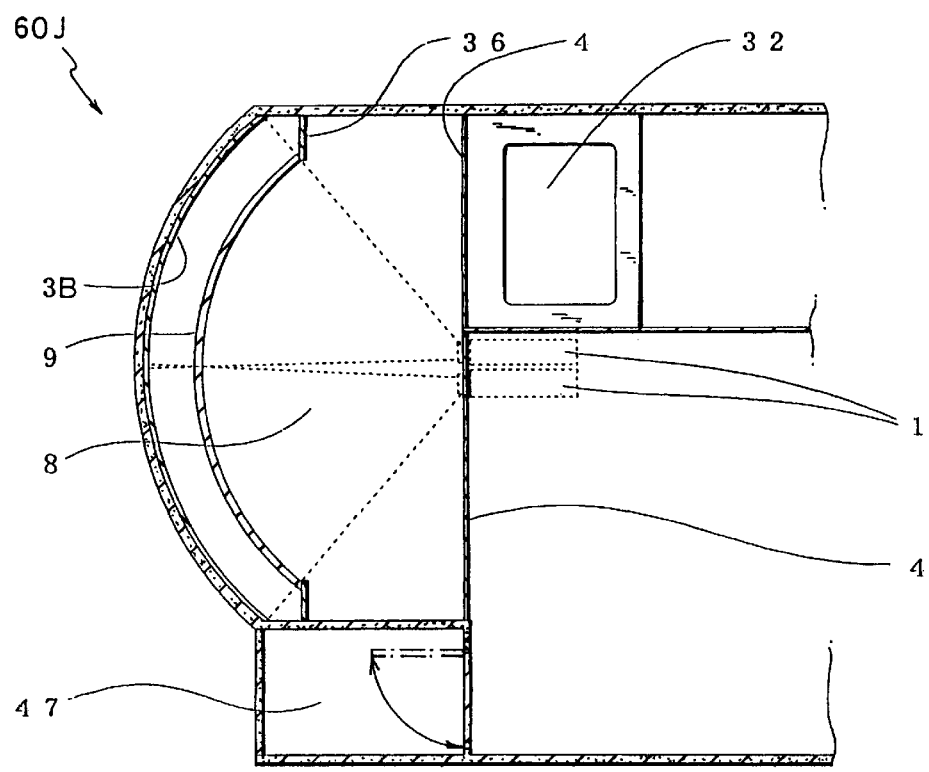
FIG. 12 is a cross-sectional view showing a eleventh embodiment of the present invention.

An eleventh embodiment of the present invention is shown in FIG. 12. It is distinguished from the tenth embodiment by the fact that a concaved screen 3B is used. Accordingly, an establishment for viewing an image 60J of the eleventh embodiment produce a wide-angle vision range of the image on the screen 3B even if the same number of projectors 1, 1 are used.

Figure 13:
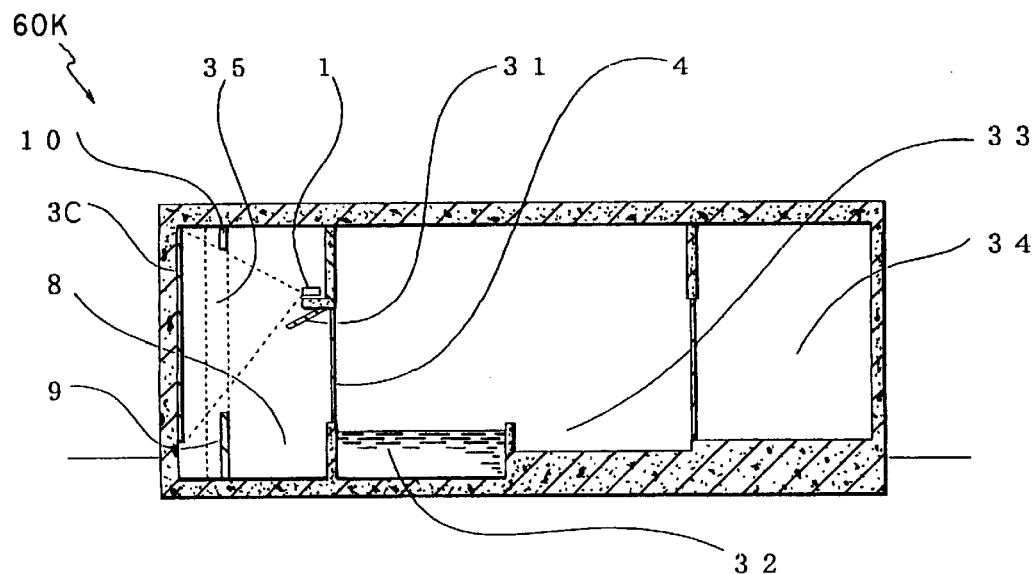
FIG. 13 is a cross-sectional view showing a twelfth embodiment of the present invention.
Figure 14:
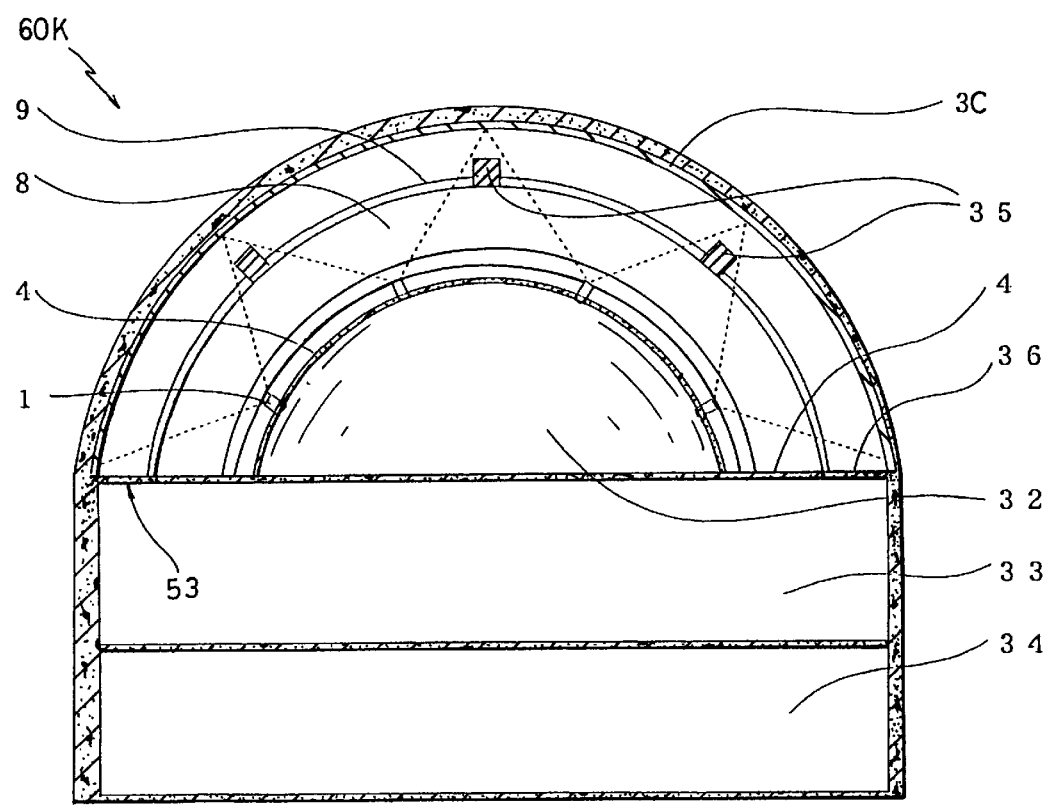
FIG. 14 is a cross-sectional view showing a twelfth embodiment of the present invention.

A twelfth embodiment of the present invention is shown in FIGS. 13 and 14. It is distinguished from the eleventh embodiment by the fact that a bath room 32, having the shape of a semi-circle, of a hot spring is used as an image viewing room. A semi-cylindrical veranda 8 is formed outside the bath room 32 at a predetermined space, and a plurality of projectors 1 are positioned above the window 4 of the bath room 32. Therefore, the panoramic image can be projected upon the screen 3C.

Moreover, right and left ends of the image are covered by the close scenery components 53, which are composed of the walls for the blindfold 36, 36. The borderline of each image produced by each respective projector of the plurality of projectors 1, 1, 1 can be camouflaged by blindfoldpillars 35, 35, 35, which imitated the props in the veranda. The finish for the connecting portion between the images does not require much detail work.

Figure 15:
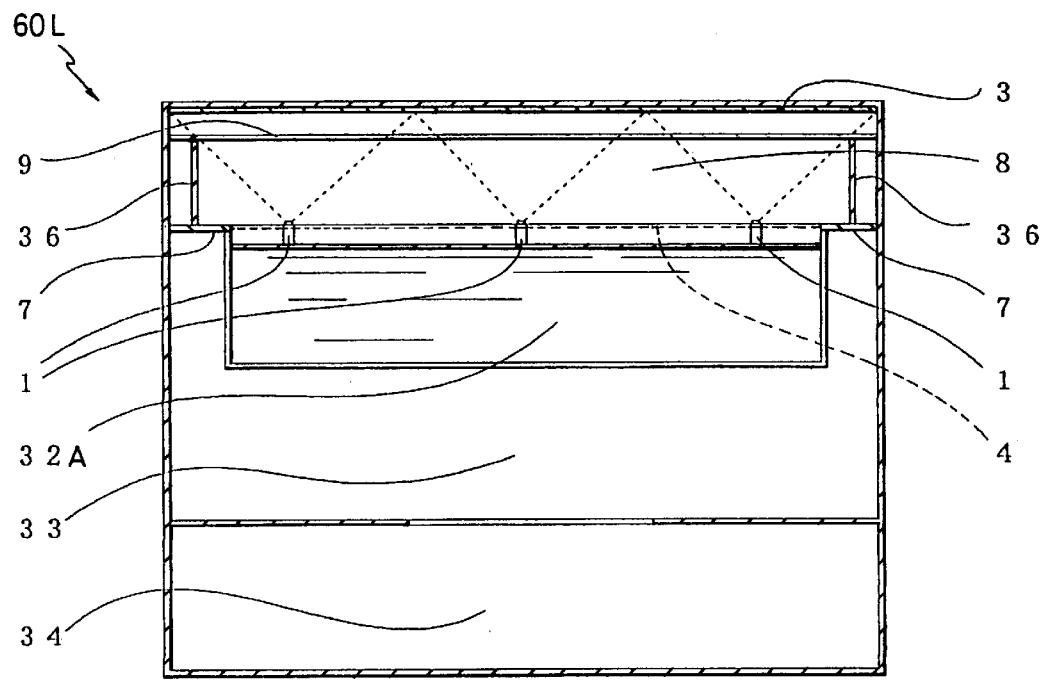
FIG. 15 is a cross-sectional view showing a thirteenth embodiment of the present invention.

A thirteenth embodiment of the present invention is shown in FIG. 15. It is distinguished from the twelfth embodiment by the fact that a bath room 32A having the shape of a square is used as an image viewing room. Also, the window 4 in the shape of a rectangle, the wall 9 of the veranda, and the screen 3 are used. Accordingly, an establishment for viewing an image 60L of the thirteenth embodiment may be used.

Figure 16:
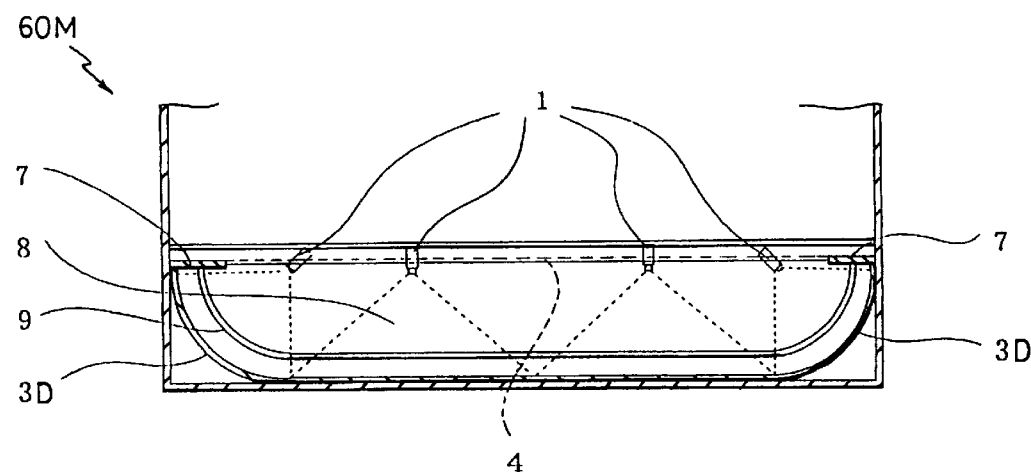
FIG. 16 is a cross-sectional view showing a fourteenth embodiment of the present invention.

A fourteenth embodiment of the present invention is shown in FIG. 16. It is distinguished from the thirteenth embodiment by the fact that each of both ends of the veranda 8 and of both end portions of a screen 3D has the shape of one-fourth of a circle. Accordingly, an establishment for viewing an image 60M of the fourteenth embodiment provides a high panoramic effect because the range of vision from the window 4 becomes more broader.

Figure 17:
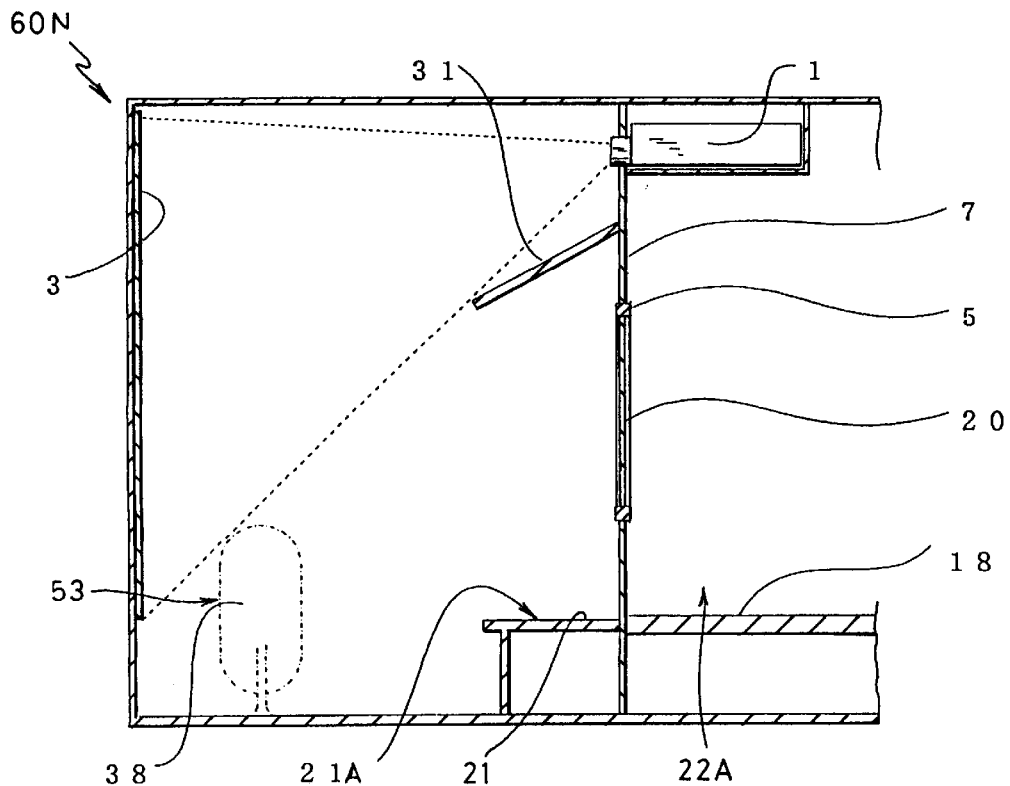
FIG. 17 is a cross-sectional view showing a fifteenth embodiment of the present invention.
Figure 18:
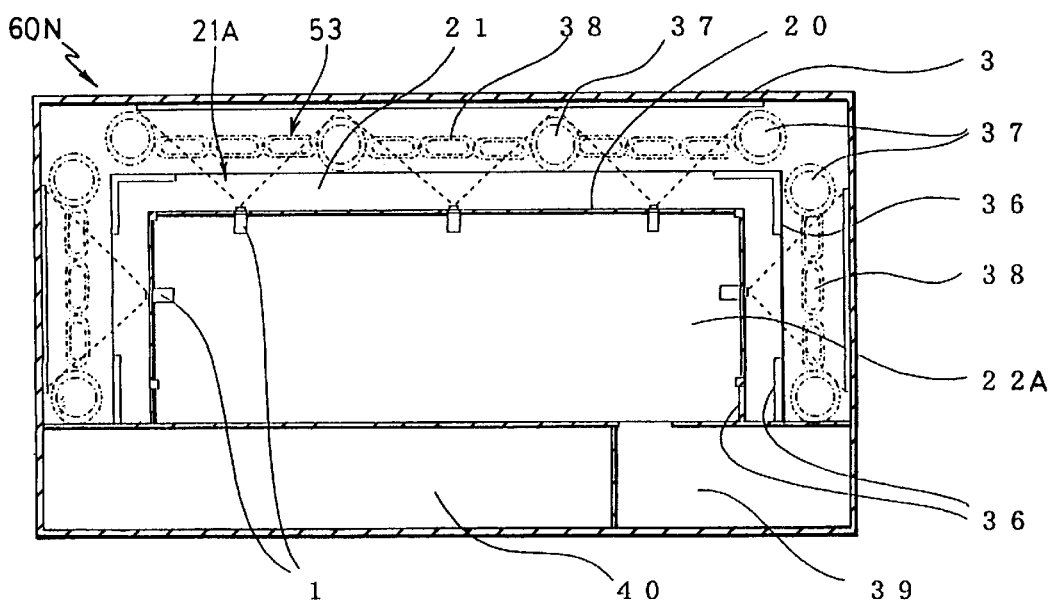
FIG. 18 is a cross-sectional view showing a fifteenth embodiment of the present invention.

A fifteenth embodiment of the present invention is shown in FIGS. 17 and 18. It is distinguished from the first embodiment by the fact that a porch 21 is mounted to a passage 21A outside a paper sliding door of the image viewing room 22A of the Japanese house, and that a close scenery component 53 includes a hedge 38, which is composed of a tree 37, a plant, or the like. Accordingly, an establishment for viewing an image 60N of the fifteenth embodiment may be used.

Figure 19:
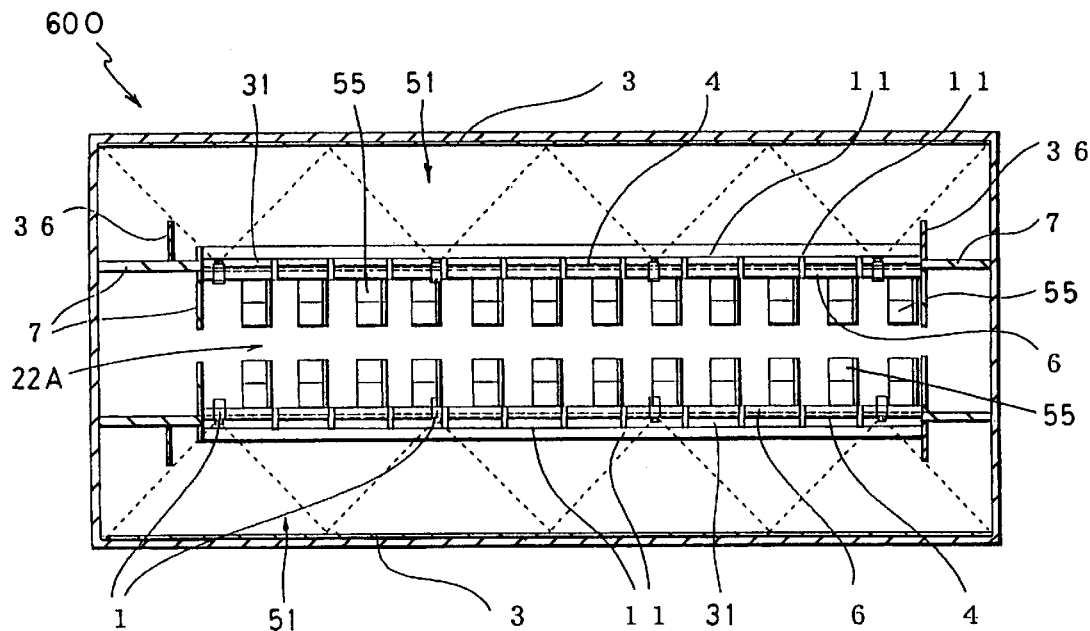
FIG. 19 is a cross-sectional view showing a sixteenth embodiment of the present invention.
Figure 20:
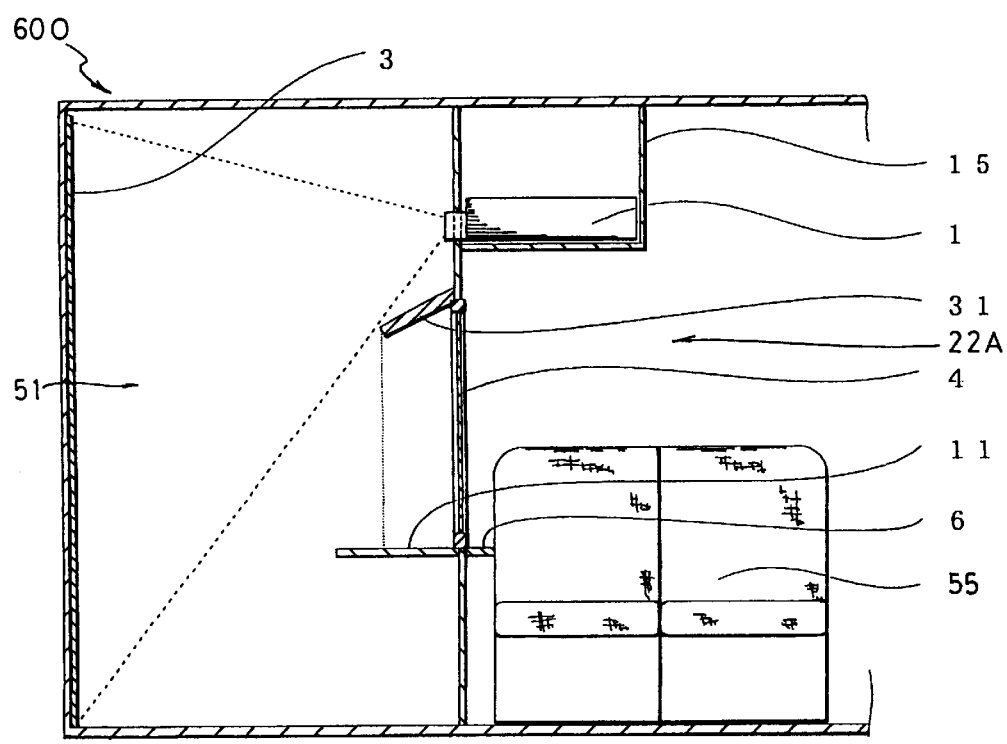
FIG. 20 is a cross-sectional view showing a sixteenth embodiment of the present invention.

A sixteenth embodiment of the present invention is shown in FIGS. 19 and 20. It is distinguished from the first embodiment by the fact that an elongated image viewing room 22A is a train having windows 4 of a common type on trains. The image viewing room 22A has sheets 55 arranged therein. Also, the screens 3, 3, as an image display device are disposed at both end portions of the image viewing room 22A. Accordingly, an establishment for viewing an image 60O of the sixteenth embodiment may be used.

Figure 21:
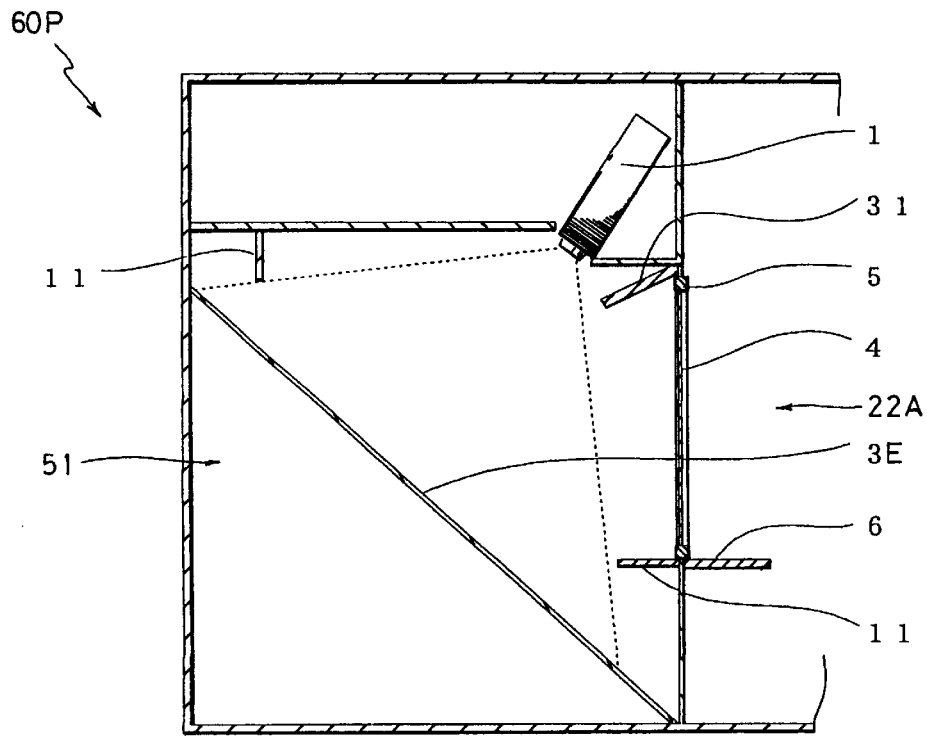
FIG. 21 is a cross-sectional view showing a seventeenth embodiment of the present invention.

A seventeenth embodiment of the present invention is shown in FIG. 21. It is distinguished from the sixteenth embodiment by the fact that a screen 3E, as an image display device and with a sloped surface, is provided in the image display room 51 such that the upper portion of the screen 3E is located forwardly at the upper portion of the image display room 51 away from the lower portion of the screen 3E located at a side of the window 4. Accordingly, an establishment for viewing an image 60P of the seventeenth embodiment may receive a projection of a motion or still image filmed in the sea or of a scenery of the ground filmed from the sky.

Moreover, in this case, the image viewing room 22A may have the shape of a ship, a submarine, an airplane, or the like.

Figure 22:
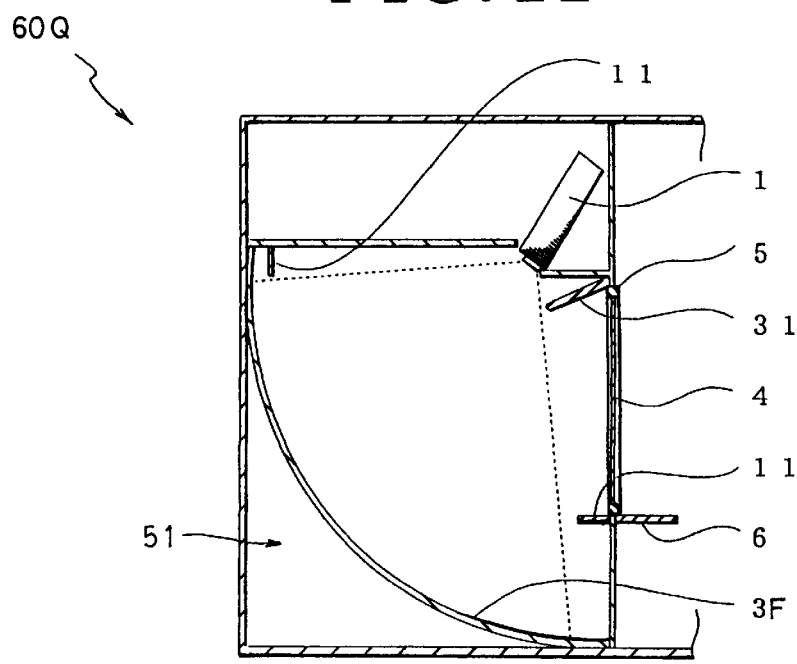
FIG. 22 is a cross-sectional view showing a eighteenth embodiment of the present invention.

An eighteenth embodiment of the present invention is shown in FIG. 22. It is distinguished from the seventeenth embodiment by the fact that a screen 3F, as an image display device, is concaved in an upward direction and a downward direction thereof Accordingly, in an establishment for viewing an image 60Q of the eighteenth embodiment, the effect of the parallax becomes large and the spectators can view the image easily because the distance between the window 4 and the screen 3F is rid of.

Figure 23:
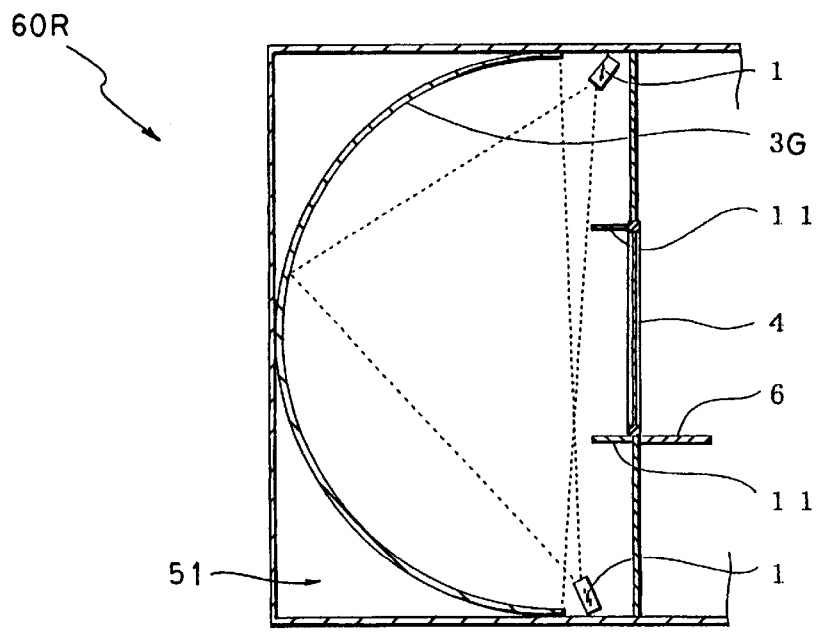
FIG. 23 is a cross-sectional view showing a nineteenth embodiment of the present invention.

A nineteenth embodiment of the present invention is shown in FIG. 23. It is distinguished from the eighteenth embodiment by the fact that a screen 3G, as an image display device, has the shape of a semi-circle. Accordingly, an establishment for viewing an image 60R of the nineteenth embodiment may be used.

Figure 24:
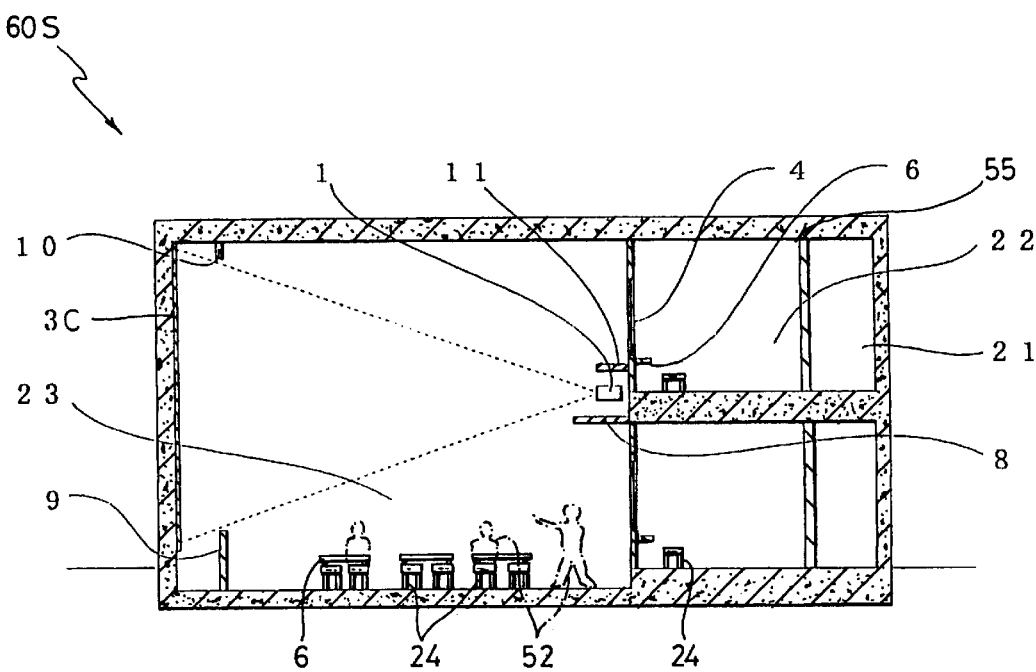
FIG. 24 is a cross-sectional view showing a twentieth embodiment of the present invention.
Figure 25:
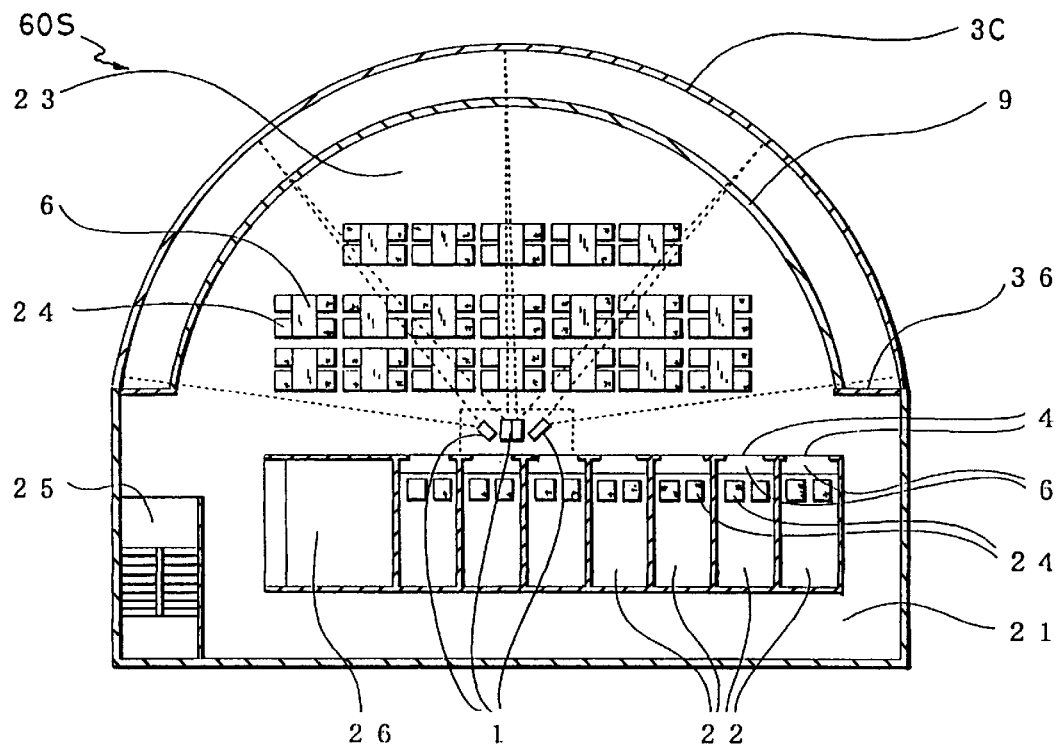
FIG. 25 is a cross-sectional view showing a twentieth embodiment of the present invention.

A twentieth embodiment of the present invention is shown in FIGS. 24 and 25. It is distinguished from the twelfth embodiment by the fact that a tea room 23 in the shape of a semicircle is available for a plurality of spectators 52, and that the two-storied compartments 55 are used. Accordingly, an establishment for viewing an image 60S of the twentieth embodiment may be used.

Figure 26:
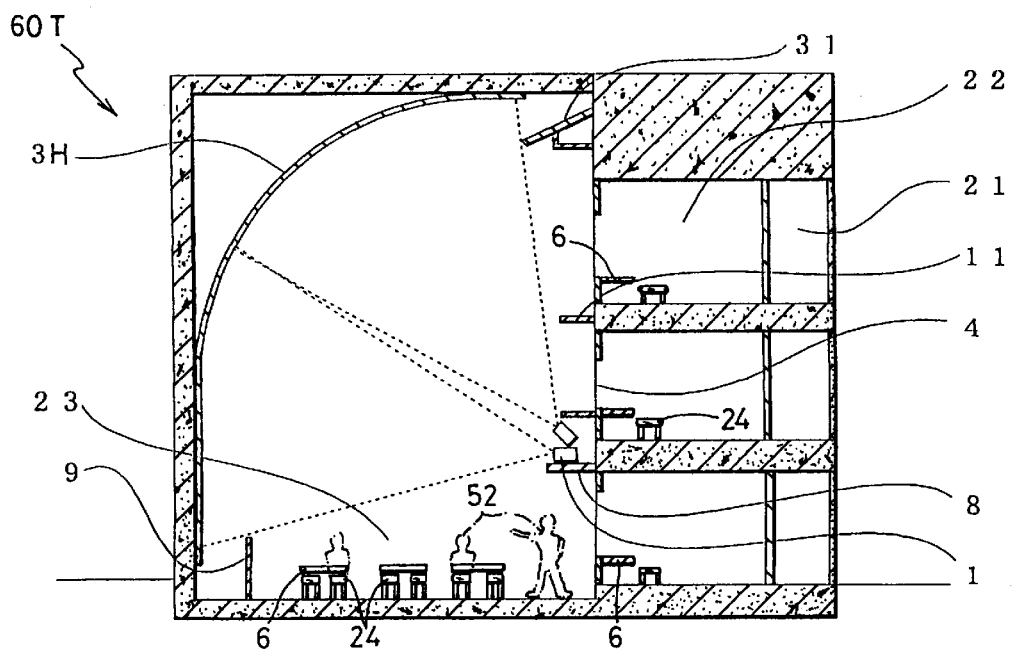
FIG. 26 is a cross-sectional view showing a twenty-first embodiment of the present invention.
Figure 27:
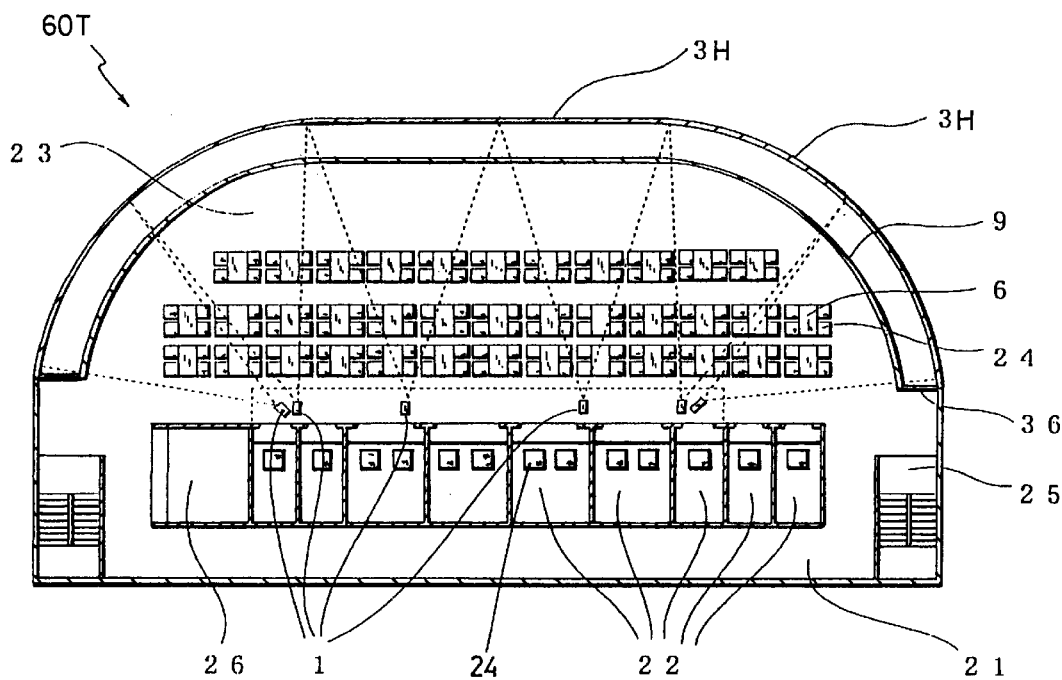
FIG. 27 is a cross-sectional view showing a twenty-first embodiment of the present invention.

A twenty-first embodiment of the present invention is shown in FIGS. 26 and 27. It is distinguished from the twentieth embodiment by the fact that a screen 3H, as an image display device, has the shape of a track, and that the upper portion of the screen 3H has the shape of an arc. Accordingly, an establishment for viewing an image 60T of the twenty-first embodiment may be used.

Figure 28:
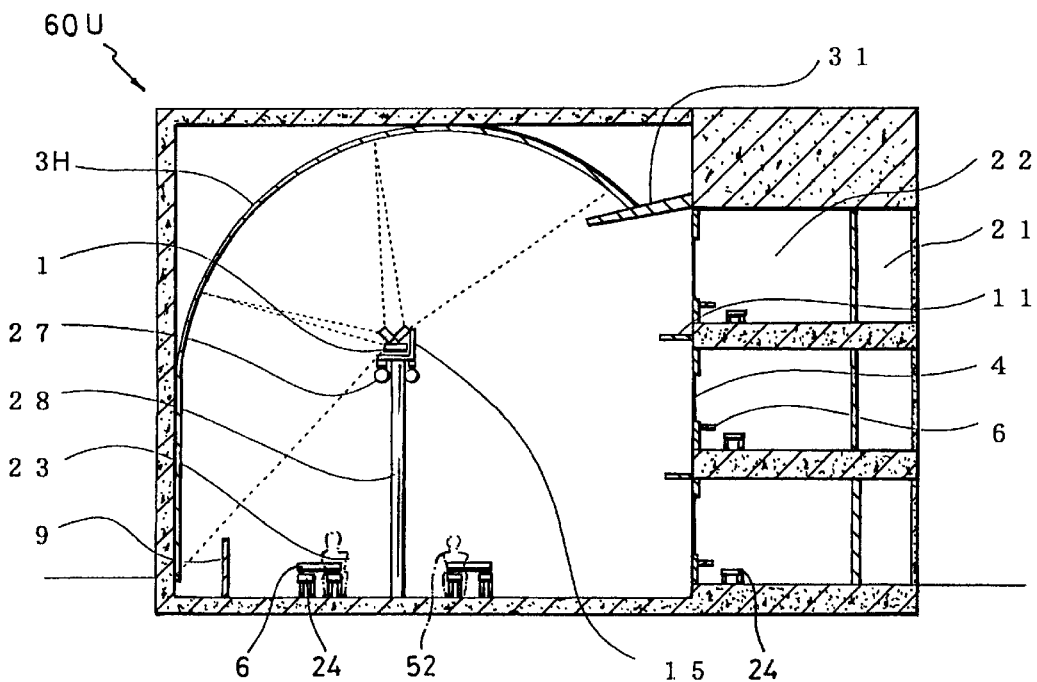
FIG. 28 is a cross-sectional view showing a twenty-second embodiment of the present invention.

A twenty-second embodiment of the present invention is shown in FIG. 28. It is distinguished from the twenty-first embodiment by the fact that three pieces of projectors 1, 1, 1 are mounted on an upper portion of a prop 28 inside the tea room 23, and that the prop 28 has lighting fixtures 27. Accordingly, an establishment for viewing an image 60U of the twenty-second embodiment may be used.

Moreover, the shape of the tea room 23 may be a semi-circle or a long and wide semi-track as illustrated in FIG. 27. The position of the prop 28 with the lighting fixtures 27 is dependent upon by the shape of the tea room 23 or of the screen 3 and upon the performance of the projector 1 or its lens. In this embodiment, the parallax is produced by the prop 28 of the lighting fixture, and the ends of the image is covered by the wall 9 and the eaves 31 so that a more deeper image is produced.

Figure 29:
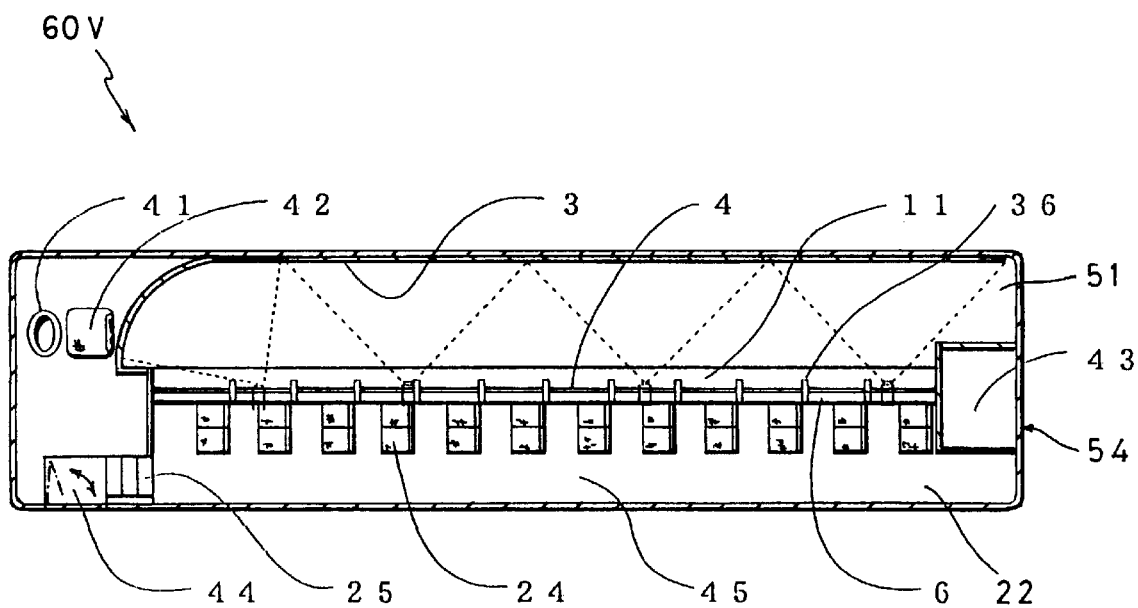
FIG. 29 is a cross-sectional view showing a twenty-third embodiment of the present invention.

A twenty-third embodiment of the present invention is shown in FIG. 29. It is distinguished from the sixteenth embodiment by the presence of a movable object, such as an electric train, a large-sized bus, or the like, the large-sized bus 54 in this embodiment, and that the image display room 51 includes the image viewing room 22 and the screen 3 inside the large-sized bus 54. Accordingly, in an establishment for viewing image 60V of the twenty-third embodiment, the spectators can enjoy the image while the establishment for viewing an image 60V is moving.

As set forth above, the advantages of the present invention are as follows:

(1) An establishment for viewing an image comprises an image viewing room having an opening thereof; an image display device provided at an outside portion of the image viewing room so that the image display device can be seen through the opening of the image viewing room; an image producing device projecting an image on the image display device; and a close scenery component provided between the image display device and the image viewing room and covering an end portion of the image that is projected on the image display device to allow parallax or perspective parallax to be produced between the close scenery component and the image so that spectators can see the image as if the image is a real scenery located close to the close scenery component because the spectators cannot see the edge of the image due to the edge being covered by the close scenery components in the veranda.

(2) As discussed above, the close scenery component, covering the edge of the image and located in the veranda, is established far away from the screen so that the parallel or perspective parallax is produced between the image and the close scenery components where the image has high reality effect.

(3) As discussed above, the close scenery component is a general natural object, not an image, such as a veranda, a window, a plant, a tree, or the like, so that the image of the close scenery component is a very natural image.

(4) As discussed above, the range of the view is composed of the real close scenery component and the image (distant view) of the close scenery component where the image has a natural depth and a sense of perspective.

(5) As discussed above, the establishment for viewing image can produce an outdoor scenery having very high reality effects so that the room is given a sense of freedom if the basement, the building next door, or the like are introduced.

(6) As discussed above, the establishment for viewing image can produce an outdoor scenery using the image so that the spectators can enjoy the various images from only one window.

(7) As discussed above, the establishment for viewing image requires a small area so that the spectators can enjoy the different images in each room or window, or the spectators can select optionally the image which are projected upon the screen.

(8) An establishment for viewing image comprises an image viewing room having an opening thereof; an image display device provided at an outside portion of the image viewing room so that the image display device can be seen through the opening of said the image viewing room; a plurality of image producing devices projecting a panoramic image on the image display device at intervals; and a close scenery component provided between the image producing devices and the image viewing room, covering an end portion of the image projected on the image display device, and allowing a parallax or perspective parallax to be produced between the close scenery component and the image so that the image producing device can project the natural panoramic image with a small area and a small cost at a one or two-storied building in the establishment having the plurality of projectors, even if a large domed screen or multiple storied building is not used.

(9) An establishment for viewing an image comprises an image viewing room having an opening thereof; an image display device provided at an outside portion of the image viewing room so that the image display device can be seen through the opening of said the image viewing room; a plurality of image producing devices projecting a panoramic image on the image display device at intervals; a camouflage member provided at a forward portion of a borderline of each image produced by each of the image producing devices projecting the panoramic image thereon; close scenery components provided between the image display device and the image viewing room, covering an end portion of the image projected upon the image display device, and allowing a parallax or perspective parallax to be produced between the close scenery components; the finish for connecting portion between the images does not require much detail work; and the panoramic image is projected with low cost.

(10) As discussed above in (1),(8) or (9), if the screen or image surface is of the open-and-close type, the spectators can open the screen or image surface and can see the real scenery outside the window, or they can allow clean air to enter the room when the image is projected.

(11) As discussed above in (1),(8) or (9), if the display, such as a liquid crystal display and the like, is used members which can optionally change the transparency of the screen or image surface, the screen and image surface become the transparency and the spectators can see the real scenery outside the window and the light is given into the room.

(12) As discussed above in (1),(8) or (9), in the establishment where there is separation of the projector body from the projecting lens and formation in the type of a connection together with an optical fiber and the like, the projector is provided apart from the projecting position so that the projector itself does not disturb the viewing of the image, and that the room can be used widely.

What is claimed is:

1. An establishment for viewing an image comprising:
   an image viewing room having an opening thereof;
   at least one image display device displaced outside of said image viewing room, said at least one image display device adapted for displaying an image and being viewable by an observer through said opening of said the image viewing room;
   at least one image producing device supplying an image to said image display device; and
   at least one close scenery component provided between said image display device and said image viewing room and covering an end portion of the image projected on said image display device for allowing the observer to view a parallax or perspective parallax produced between said close scenery component and the image when viewed from a viewing position in said image viewing room.

2. The establishment for viewing an image according to claim 1, wherein said image viewing room is a fixed structure.

3. The establishment for viewing an image according to claim 1, wherein said image viewing room is positioned upon a movable object.

4. The establishment for viewing an image according to claim 1, wherein said at least one image display device is a screen.

5. The establishment for viewing an image according to claim 1, wherein said at least one image display device is used in one of a liquid crystal display and a plasma display.

6. The establishment for viewing an image according to claim 1, wherein said at least one image producing device is a projector.

7. The establishment for viewing an image according to claim 1, wherein said at least one image producing device is one of a personal computer and a video tape recorder, and supplies the image to one of a liquid crystal and a plasma display.

8. The establishment for viewing an image according to claim 1, further comprising a window on a wall surface of said image viewing room and at least one eave being attached to said window wherein said window has said opening of said image viewing room positioned within said window,
   said at least one eave and said at least one close scenery component covering an upper portion and a lower portion of the image positioned upon said image display device.

9. The establishment for viewing an image according to claim 1, further comprising an image display room in communication with said image viewing room,
   said image display room having at least one wall surface and a window on said at least one wall surface,
   said image display device being a closure screen provided operably at said window of said image display room wherein said closure screen is operable to be placed in an open position and a closed position.

10. The establishment for viewing an image according to claim 1, further comprising an image display room in communication with said image viewing room,
    said at least one image producing device being positioned at an upper portion of said image display room.

11. The establishment for viewing an image according to claim 10, wherein said at least one image producing device is positioned at at least one of a lower portion of said image display room and said upper portion of said image display room.

12. The establishment for viewing an image according to claim 1, further comprising an image supplying device in communication with said image display device and with said at least one image producing device.

13. The establishment for viewing an image according to claim 12, wherein said image display device is one of a liquid crystal display and a plasma display and said at least one image producing device is at least one of a personal computer and a video tape recorder.

14. The establishment for viewing an image according to claim 12, further comprising a bow window in communication with said image viewing room wherein said bow window contains said image display device and said at least one close scenery component.

15. The establishment for viewing an image according to claim 14, wherein said image display device has a concave shape.

16. The establishment for viewing an image according to claim 4, wherein said screen has a concave shape.

17. The establishment for viewing an image according to claim 1, further comprising a window on a wall surface of said image viewing room wherein said window has said opening of said image viewing room positioned within said window,
    said image viewing room having a shape selected from semi-circular and square.

18. The establishment for viewing an image according to claim 1, further comprising an image display room in communication with said image viewing room and having at least two opposite ends,
    said image display device having at least two opposite end portions wherein each of said ends of said image display room and of said end portions of said image display device has a shape of a quarter of a circle.

19. The establishment for viewing an image according to claim 1, further comprising a porch mounted outside of said image viewing room.

20. The establishment for viewing an image according to claim 1, wherein said image viewing room is a viewing room of a movable object.

21. The establishment for viewing an image according to claim 1, wherein the movable object is a train or a bus.

22. The establishment for viewing an image according to claim 20, wherein said image viewing room has at least two opposite ends and said at least one image display device is at least two display devices each disposed at a respective one of said ends of said image viewing room.

23. The establishment for viewing an image according to claim 1, further comprising an image display room in communication with said image viewing room,
    said at least one image display device being a screen having a sloped surface in communication with said image display room wherein an upper portion of said screen is displaced forwardly at said upper portion of said screen away from a lower portion of said screen.

24. The establishment for viewing an image according to claim 23, wherein said image viewing room has a shape which is one of a ship, a submarine, and an airplane.

25. The establishment for viewing an image according to claim 1, further comprising an image display room in communication with said image viewing room,
    said at least one image display device having a shape which is one of a concave shape in an upward direction and a lower direction thereof and a semi-circle.

26. The establishment for viewing an image according to claim 1, further comprising an image display room in communication with said image viewing room, said at least one image display device having a shape of a track, an upper portion of said at least one image display device having a shape of an arc.

27. The establishment for viewing an image according to claim 1, further comprising an image display room in communication with said image viewing room and a prop positioned inside said image viewing room, said at least one image producing device being positioned on an upper portion of said prop.

28. The establishment for viewing an image according to claim 27, wherein said prop has lighting means.

29. The establishment for viewing an image according to claim 1, wherein the viewing position is displaced a predetermined distance from said opening.

30. An establishment for viewing an image comprising:

an image viewing room having an opening thereof;

at least one image display device displaced outside of said image viewing room, said at least one image display device adapted for displaying an image and being viewable by an observer through said opening of said the image viewing room;

a plurality of image producing devices projecting a panoramic image on said image display device at predetermined intervals; and at least one close scenery component provided between at least one of said image producing devices and said image viewing room and covering an end portion of the image projected on said image display device for allowing the observer to view a parallax or perspective parallax produced between said close scenery component and the image when viewed from a viewing position in said image viewing room.

31. The establishment for viewing an image according to claim 30, wherein said image viewing room is a fixed structure.

32. The establishment for viewing an image according to claim 30, wherein said image viewing room is positioned upon a movable object.

33. The establishment for viewing an image according to claim 30, wherein said at least one image display device is a screen.

34. The establishment for viewing an image according to claim 30, wherein said at least one image producing device is a projector.

35. The establishment for viewing an image according to claim 30, wherein said at least one image producing device is one of a personal computer and a video tape recorder, and supplies the image to one of a liquid crystal and a plasma display.

36. The establishment for viewing an image according to claim 30, wherein the viewing position is displaced a predetermined distance from said opening.

37. An establishment for viewing an image comprising:

an image viewing room having an opening thereof;

at least one image display device displaced outside of said image viewing room, said at least one image display device adapted for displaying an image and being viewable by an observer through said opening of said the image viewing room;

a plurality of image producing devices projecting a panoramic image on said image display device at predetermined intervals;

a camouflage member provided at a front portion of a borderline of each image produced by said image producing devices projecting the panoramic image thereon; and at least one close scenery component provided between at least one of said image producing devices and said image viewing room and covering an end portion of the image projected on said image display device for allowing the observer to view a parallax or perspective parallax produced between said close scenery component and the image when viewed from a viewing position in said image viewing room.

38. The establishment for viewing an image according to claim 37, wherein said image viewing room is a fixed structure.

39. The establishment for viewing an image according to claim 37, wherein said at least one image display device is a screen.

40. The establishment for viewing an image according to claim 37, wherein said at least one image display device is used in one of a liquid crystal display and a plasma display.

41. The establishment for viewing an image according to claim 37, wherein said at least one image producing device is a projector.

42. The establishment for viewing an image according to claim 37, wherein said at least one image producing device is one of a personal computer and a video tape recorder, and supplies the image to one of a liquid crystal and a plasma display.

43. The establishment for viewing an image according to claim 37, wherein the viewing position is displaced a predetermined distance from said opening.

44. An establishment for viewing an image comprising:

an image viewing room having an opening thereof;

an image display device displaced outside of said image viewing room, said image display device adapted for displaying an image and being viewable by an observer through said opening of said the image viewing room;

a reflecting mirror projecting the image upon a surface of said image display device;

at least one image producing device supplying the image to said image display device; and at least one close scenery component provided between said image display device and said image viewing room and covering an end portion of the image projected on said image display device for allowing the observer to view a parallax or perspective parallax produced between said close scenery component and the image when viewed from a viewing position in said image viewing room.

* * * * *